United States Patent [19]
Weber et al.

[11] Patent Number: 6,028,130
[45] Date of Patent: Feb. 22, 2000

[54] FLAME-RETARDANT THERMOPLASTIC COMPOSITIONS WITH IMPROVED STABILITY

[75] Inventors: Martin Weber, Maikammer; Joachim Seibring, Freinsheim, both of Germany

[73] Assignee: BASF Aktiengesellschaft, Ludwigshafen, Germany

[21] Appl. No.: 08/882,728

[22] Filed: Jun. 26, 1997

[30] Foreign Application Priority Data

Jun. 26, 1996 [DE] Germany .......................... 196 25 604

[51] Int. Cl.⁷ ....................................................... C08J 5/53
[52] U.S. Cl. ........................... 524/126; 524/508; 525/132
[58] Field of Search ................................... 524/122, 126; 525/508, 132

[56] References Cited

FOREIGN PATENT DOCUMENTS

| | | |
|---|---|---|
| 57-105452 | 6/1982 | Japan . |
| 03215552 | 9/1991 | Japan . |
| 06179823 | 6/1994 | Japan . |

*Primary Examiner*—Robert Dawson
*Assistant Examiner*—D. Aylward
*Attorney, Agent, or Firm*—Keil & Weinkauf

[57] ABSTRACT

Flame-retardant thermoplastic molding compositions comprise

A) at least one polyphenylene ether, and
B) at least one vinylaromatic polymer, wherein the thermoplastic molding composition includes
C) at least one oligomeric phosphorus compound as flame retardant and
D) a mixture of
  $D_1$) at least one sterically hindered phenol and
  $D_2$) at least one phosphonite as stabilizer, and are used to produce fibers, films and shaped articles.

12 Claims, No Drawings

FLAME-RETARDANT THERMOPLASTIC COMPOSITIONS WITH IMPROVED STABILITY

The present invention relates to flame-retardant molding compositions which contain polyphenylene ethers and vinylaromatic polymers and have improved stability, to the use of the novel thermoplastic molding compositions for producing fibers, films and shaped articles, and to the fibers, films and shaped articles obtainable using the novel molding compositions.

Polymer mixtures made from polyphenylene ethers (PPE) and styrene polymers are known, for example from U.S. Pat. Nos. 3,383,435; 4,128,602 and 4,128,603. Such molding compositions are suitable for producing shaped articles which have a heat resistance better than that of impact-modified styrene polymers (HIPS, high impact polystyrene) which are not blended with polyphenylene ethers. A detailed description of the properties of these polymer mixtures is also found in L. Bottenbruch, Technische Polymer-Blends, Kunststoff Handbuch 3/2, Ranser verlag, Munich, 1993.

A significant advantage of the polymer blends made from polyphenylene ether and styrene polymers is that, by adding halogen-free flame retardants, in particular phosphorus-containing compounds, molding compositions can be prepared which are flame-retardant and which therefore can be used for many applications in the electrical engineering sector. For application in the electrical engineering sector, the UL 94 flammability test (in J. Troitzsch, International Plastics Flammability Handbook, p. 346 ff., Hanser Verlag, Munich, 1990), in particular, is decisive. Since blends made from PPE and HIPS are often used as casing material, effective stabilization against the effects of heat and light is also required.

There is a need for new, more effective stabilizers for blends made from polyphenylene ether and vinylaromatic polymer, such as impact-modified polystyrene.

There are various proposals in the prior art as to how the heat resistance of thermoplastic molding compositions can be further improved.

For example, EP 0 038 183 discloses that the heat resistance of polyphenylene ether resins can be improved by adding phosphonic acids of the formula $R_a(O)P(OR_b)(OR_c)$ or derivatives of these. It also proposes adding a synergistically active combination of sterically hindered phenol and phosphonic acid and/or a derivative thereof, for further improvement of the heat resistance of the resins. It is said that the heat resistance of the resins can be still further increased if an organic mono- or polyphosphite, such as triphenyl phosphite, is also added.

EP 0 036 278 likewise discloses PPE resins whose heat resistance is increased by adding a phosphonous acid of the formula $R_dP(OR_e)(OR_f)$ or a derivative thereof. The heat resistance of the resins can be still further increased by adding a synergistic combination of sterically hindered phenol and phosphonous acid. The best results are said to be achieved here, too, only after further addition of an organic mono- or polyphosphite. EP 0 036 278 cites various esters of monophosphonous acid and diphosphonites as examples of derivatives of phosphonous acid.

Both EP 0 038 183 and EP 0 036 278 propose the use of bromine-containing flame retardants or of monophosphate-containing flame retardants, such as triphenyl phosphate and tricresyl phosphate.

JP-A-57207642 describes PPE/HIPS blends, in which, besides resorcinol diphenyl phosphate (RDP), triphenyl phosphite is also used. These molding compositions are said to have improved heat resistance and processability.

EP 0 467 113 moreover discloses flame-retardant molding compositions made from PPE/HIPS which may contain an organophosphorus flame retardant. It is proposed, furthermore, to add phosphites in order to improve the tensile strength of objects produced from the molding compositions.

JP-A-04279660 proposes adding a metal oxide, such as ZnO, to inhibit gel formation, during the processing of a PPE/EIPS molding composition. Oligophosphates, such as phenyl resorcinol polyphosphate, are proposed as flame retardants in these molding compositions. These molding compositions may also contain octadecyl 3-(3,5-di-tert-butyl-4-hydroxyphenyl)propionate.

However, the combinations of flame retardants and stabilizers which have hitherto been described are not adequate to meet industrial requirements.

It is an object of the present invention to provide flame-retardant molding compositions which are based on polyphenylene ether and vinylaromatic polymers and which, in comparison with molding compositions of known type, have improved property profiles. A particular object is to improve the stress cracking behavior, the heat ageing and, if appropriate, the flowability of PPE/HIPS molding compositions.

We have found that this object is achieved by providing thermoplastic molding compositions of the type described at the outset which contain oligophosphates as flame retardants and a stabilizer combination made from sterically hindered phenol and a phosphonite. The novel molding compositions have a property profile which is significantly improved to a surprising degree when compared with that of conventional molding compositions of similar type, and in particular have advantages with respect to stress cracking behavior, heat ageing and in some cases also with respect to flowability.

The advantages associated with the novel molding compositions are also especially surprising because it could not be expected on the basis of the prior art that a further improvement in the property profile is achievable by specific selection of a combination of flame retardant and stabilizer.

The invention thus provides a flame-retardant thermoplastic molding composition comprising
A) at least one polyphenylene ether, and
B) at least one vinylaromatic polymer,
wherein the thermoplastic molding composition includes
C) at least one oligomeric phosphorus compound as flame retardant and
D) a mixture of
  $D_1$) at least one sterically hindered phenol and
  $D_2$) at least one phosphonite as stabilizer.

Preference is given in particular to molding compositions in which the stabilizer mixture is present in a proportion of from about 0.1 to about 5% by weight, and the flame retardant in a proportion of from about 1 to about 20% by weight, based in each case on the total weight of the molding composition.

In a particularly preferred embodiment, the invention provides molding compositions comprising
A) from about 5 to about 97.9% by weight of polyphenylene ether,
B) from about 1 to about 93.9% by weight of styrene polymer,
C) from about 1 to about 20% by weight of flame retardant,
D) from about 0.1 to about 5% by weight of stabilizer mixture of, based in each case on the total weight of component D, D$_1$) from about 5 to about 95% by weight of a sterically hindered phenol and D$_2$) from about 5 to about 95% by weight of a phosphonite, E) from 0 to about 50% by weight of impact modifiers and F) from 0 to 60% by weight of conventional additives.

The invention also provides the use of the novel molding compositions for producing flame-retardant shaped articles, fibers and films.

It further provides flame-retardant shaped articles, fibers and films which have been produced using the novel molding compositions.

The polyphenylene ethers (component A) present in the novel molding compositions are known per se and are present in the novel molding compositions in an amount of from about 5 to about 97.9% by weight, preferably from about 15 to about 87.9% by weight, and in particular from about 20 to about 82.4% by weight, based on the total weight of the molding composition.

Component A includes, in particular, compounds based on substituted, in particular disubstituted, polyphenylene ethers, where the ethereal oxygen of one unit is bonded to the benzene ring of the adjacent unit. Preference is given to the use of polyphenylene ethers which are substituted in the 2- and/or 6-position to the oxygen atom. Examples of substituents are halogen, such as chlorine or bromine, long-chain alkyl having up to 20 carbon atoms, such as lauryl and stearyl, and short-chain alkyl having from 1 to 4 carbon atoms, preferably without any tertiary hydrogen in the α-position, eg. methyl, ethyl, propyl or butyl. The alkyl radicals may themselves be singly or multiply substituted by halogen, such as chlorine or bromine, or by hydroxyl. Other examples of possible substituents are alkoxy, preferably having from 1 to 4 carbon atoms, and phenyl, which may be unsubstituted or singly or multiply substituted with halogen and/or C$_1$–C$_4$-alkyl according to the above definition. Copolymers of different phenols, such as copolymers of 2,6-dimethylphenol and 2,3,6-trimethylphenol, are likewise suitable. Mixtures of different polyphenylene ethers may, of course, also be used.

Examples of polyphenylene ethers which may be used according to the invention are
poly(2,6-dilauryl-1,4-phenylene) ether,
poly(2,6-diphenyl-1,4-phenylene) ether,
poly(2,6-dimethoxy-1,4-phenylene) ether,
poly(2,6-diethoxy-1,4-phenylene) ether,
poly(2-methoxy-6-ethoxy-1,4-phenylene) ether,
poly(2-ethyl-6-stearyloxy-1,4-phenylene) ether,
poly(2,6-dichloro-1,4-phenylene) ether,
poly(2-methyl-6-phenyl-1,4-phenylene) ether,
poly(2,6-dibenzyl-1,4-phenylene) ether,
poly(2-ethoxy-1,4-phenylene) ether,
poly(2-chloro-1,4-phenylene) ether,
poly(2,5-dibromo-1,4-phenylene) ether.

Preference is given to the use of polyphenylene ethers which have, as substituents, alkyl radicals having from 1 to 4 carbon atoms, for example
poly(2,6-dimethyl-1,4-phenylene) ether,
poly(2,6-diethyl-1,4-phenylene) ether,
poly(2-methyl-6-ethyl-1,4-phenylene) ether,
poly(2-methyl-6-propyl-1,4-phenylene) ether,
poly(2,6-dipropyl-1,4-phenylene) ether and
poly(2-ethyl-6-propyl-1,4-phenylene) ether.

For the purposes of the invention, the term polyphenylene ethers is taken also to mean those which are modified with monomers, such as fumaric acid, maleic acid or maleic anhydride.

Such polyphenylene ethers are described, inter alia, in WO 87/00540.

Polyphenylene ethers used in the formulations are in particular those with a mean molecular weight $M_w$ (weight average) of from about 8000 to 70,000, preferably from about 12,000 to 50,000, and in particular from about 20,000 to 45,000.

This corresponds to a limiting viscosity of from about 0.18 to 0.7 dl/g, preferably from about 0.25 to 0.55 dl/g, and in particular from about 0.30 to 0.50 dl/g, measured in chloroform at 25° C.

The molecular weight distribution is generally determined by gel permeation chromatography (Shodex 0.8×50 cm separation columns of type A 803, A 804 and A 805, with THF as eluant at room temperature). The polyphenylene ether specimens are dissolved in THF under superatmospheric pressure at 110° C. and 0.16 ml of a 0.25% strength by weight solution is injected.

A UV detector is generally used, and the columns are calibrated with polyphenylene ether specimens whose absolute molecular weight distribution has been determined by a combination of GPC and laser light scattering.

The vinylaromatic polymer (component B) is present in the novel molding compositions in amounts of from about 1 to about 94% by weight, preferably from about 10 to about 82.9% by weight, and in particular from about 15 to about 77.5% by weight, based on the total weight of the molding composition. Component B is a vinylaromatic polymer which is preferably compatible with the polyphenylene ether employed. Suitable homo- and copolymers are those which are made from vinylaromatic monomers having from 8 to 12 carbon atoms and which are prepared in the presence of a rubber. The rubber content is from about 5 to 25% by weight, preferably from about 8 to 17% by weight. Impact-modified polystyrenes or copolymers of styrene and other vinylaromatic compounds are particularly suitable. Impact-modified polystyrenes of this type are generally known in the form of HIPS and are to a large extent commercially available. They have a viscosity number (VN) of the hard matrix of from about 50 to about 130 ml/g (0.5% strength in toluene at 23° C.), preferably of from about 60 to about 90 ml/g.

Suitable monovinylaromatic compounds here are ring- or side-chain-alkylated styrenes, for example chlorostyrene, o-methyl-styrene, p-methylstyrene, vinyltoluene and p-tert-butylstyrene. However, styrene alone is preferably used.

The homopolymers are generally prepared by the known processes in bulk, solution or suspension (cf. Ullmanns Enzyklopädie der techn. Chemie, Volume 19, pp. 265–272, Verlag Chemie, Weinheim 1980). The homopolymers may have molecular weights $M_w$, which can be determined by conventional methods, of from about 3000 to 300,000 (weight average). Examples of suitable comonomers for preparing copolymers are (meth)acrylic acid, alkyl (meth) acrylates having from 1 to 4 carbon atoms in the alkyl radical, acrylonitrile, maleic anhydride, maleimide, acrylamide and methacrylamide, and their N,N- or N-alkyl-substituted derivatives having from 1 to 10 carbon atoms in the alkyl radical. Suitable examples of such C$_1$–C$_{10}$-alkyl groups include methyl, ethyl, n-propyl, isopropyl, n-butyl, tert-butyl and unbranched or branched pentyl, hexyl, heptyl, octyl, nonyl and decyl. Depending on their chemical structure, the comonomers are present in different amounts in the styrene polymers. The deciding factor for the content of comonomers in the copolymer is the miscibility of the copolymer with the polyphenylene ether. Such mixing limits are known and are described, for example, in U.S. Pat. No.

4,360,618, U.S. Pat. No. 4,405,753 and in the publication by J. R. Fried, G. A. Hanna, Polymer Eng. Scie., Vol. 22 (1982), p. 705 ff. The copolymers are prepared by known processes, described, for example, in Ullmanns Enzyklopadie der techn. Chemie, Vol. 19, p. 273 ff, Verlag Chemie, Weinheim (1980). The copolymers generally have weight-average molecular weights ($M_w$), which can be determined by conventional methods, of from about 10,000 to about 300,000.

Component B according to the invention is preferably impact-modified polystyrene.

The most frequently used processes for preparing impact-modified styrene polymers are polymerization in bulk or solution in the presence of a rubber, for example as described in U.S. Pat. No. 2,694,692, and bulk-suspension polymerization processes, for example as described in U.S. Pat. No. 2,862,906. Other processes may, of course, also be used, as long as the particle size of the rubber phase is adjusted to the desired value.

The novel molding compositions contain, as flame retardant (component C), from about 1 to about 20% by weight, preferably from about 2 to about 19% by weight, and in particular from about 2.5 to about 18% by weight, of at least one flame retardant of the formula (I), (II) or (III):

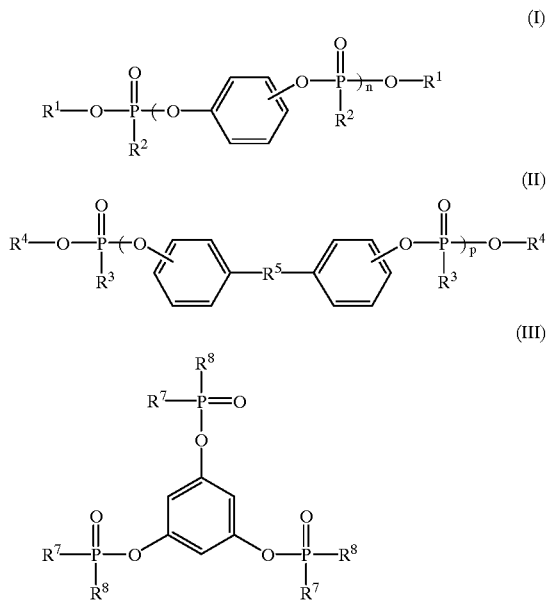

where
$R^1$ and $R^4$, independently of one another, are unsubstituted or substituted alkyl or aryl;
$R^2$, $R^3$, $R^7$ and $R^8$, independently of one another, are unsubstituted or substituted alkyl, aryl, alkoxy or aryloxy,
$R^5$ is alkylene, —$SO_2$—, —CO—, —N=N— or —($R^6$)P(O)—, where
$R^6$ is unsubstituted or substituted alkyl, aryl or alkylaryl and n and p, independently of one another, are integers or non-integers from 1 to 30.

Suitable substituents in compounds of the formulae (I), (II) and (III) are cyano, hydroxyl, $C_1$–$C_4$-alkyl and halogen, such as F, Cl, Br and I.

Preferred alkyl radicals in compounds of the formulae (I), (II) and (III) are $C_1$–$C_{20}$-alkyl, in particular $C_1$–$C_{12}$-alkyl, such as methyl, ethyl, n-propyl, n-butyl, neopentyl, n-hexyl, n-octyl, n-nonyl, n-dodecyl, 2-ethylhexyl, 3,5,5-trimethylhexyl and cyanoethyl.

Preferred aryl radicals in compounds of the formulae (I), (II) and (III) are phenyl, naphthyl and singly or multiply substituted radicals, such as tolyl, xylyl, mesityl and cresyl.

Preferred alkylaryl radicals in compounds of the formulae (I), (II) and (III) are $C_1$–$C_{20}$-alkylaryl, in particular $C_1$–$C_{12}$-alkyl-aryl, the alkyl and aryl parts being as defined above.

Preferred cycloalkyl groups in compounds of the formulae (I), (II) and (III) include $C_3$–$C_{10}$-cycloalkyl, such as cyclobutyl, cyclopentyl, cyclohexyl and cycloheptyl.

Preferred alkoxy radicals in compounds of the formulae (I), (II) and (III) are $C_1$–$C_{20}$-alkoxy, the $C_1$–$C_{20}$-alkyl part being as defined above.

Preferred aryloxy radicals in compounds of the formulae (I), (II) and (III) are those in which the aryl content is as defined above.

Preferred alkylene radicals in compounds of the formulae (I), (II) and (III) are $C_1$–$C_6$-alkylene, such as methylene, ethylene, propylene and hexylene.

The preparation of esters of phosphoric acid is generally described in Houben-weyl, Methoden der organischen Chemie, Vol. XII/2, Thieme Verlag, 1972. The compounds used according to the invention are preferably obtained by base-catalyzed transesterification or by reaction of phosphoryl chloride with phenols with catalysis by magnesium chloride and/or aluminium chloride. Suitable compounds are obtained by reacting bisphenols (cf. e.g. the bisphenols mentioned in Ullmann's Encyclopedia of Industrial Chemistry, 5th ed., Vol. A19, p. 349) with phosphates, such as triphenyl phosphates. Preference is given to the use of the commercially available products based on resorcinol diphenyl phosphate and the commercially available reaction products of bisphenol A and triphenyl phosphate. It should be noted that each of the industrially available products usually is a mixture of different oligomers and/or isomers.

Mixtures of higher phosphates and monophosphates and/ or monophosphine oxides in any mixing ratio may also be used.

The thermoplastic molding compositions have, as component D, from about 0.1 to 10% by weight, in particular from about 0.5 to about 5% by weight, of a stabilizer mixture comprising $D_1$) from 5 to 95% by weight, in particular from about 40 to about 60% by weight, of a sterically hindered phenol and $D_2$) from 5 to 95% by weight, in particular -from about 40 to about 60% by weight, of a phosphonite (in each case based on component D).

The sterically hindered phenol is preferably selected from the group consisting of compounds of the formula

where
a is an integer from 1 to 4,
Z is hydrogen or, if a is 2, 3 or 4, a bridging group having 2, 3 or 4 bonded Ph groups,
Ph is a sterically hindered phenol group of the formula (IV) or (V),

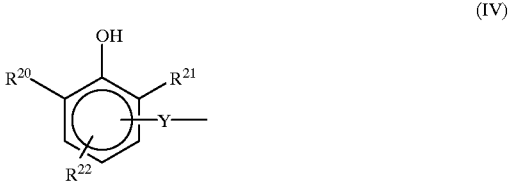

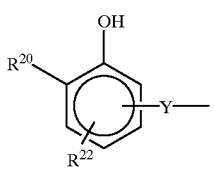

where
R²⁰ is straight-chain or branched $C_4$–$C_{10}$-alkyl,
R²¹ is hydrogen or is as defined for R²⁰,
R²² is selected from the group consisting of hydrogen, alkyl, alkoxy, alkoxycarbonylalkyl, —P(O)(OR²³)₂, where R²³ is lower alkyl, amino, unsubstituted or substituted arylamino or unsubstituted or substituted heteroarylamino; and
Y is a chemical bond or carbonylalkyl (-alkyl-C(O)—), for example in particular —$C_1$–$C_4$—C(O)—, the bond to Z being via the carbonyl group.

If a is 2, the bridging group Z is preferably —S—, —O—, —N—, alkylene, cycloalkylene, cycloalkylidene or diiminoalkylene (—HN-alkylene-NH—), the alkylene part being defined as above for the formulae (I), (II) and (III). Examples of suitable cycloalkylene groups are cyclopentylene, cyclohexylene and cycloheptylene. Examples of suitable cycloalkylidene groups are cyclopentylidene, cyclohexylidene and cycloheptylidene.

If a is 3, the bridging group Z is preferably

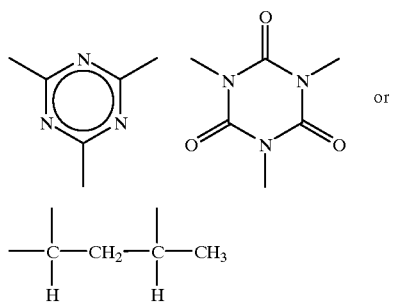

If a is 4, Z is preferably

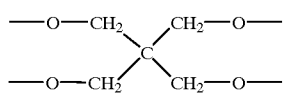

Examples Of $C_4$–$C_{10}$-alkyl in groups of the formulae (IV) and (V) are n-butyl, sec-butyl, isobutyl, tert-butyl, n-pentyl, sec-pentyl, isopentyl, n-hexyl, 1-, 2- or 3-methylpentyl; unbranched heptyl, octyl, nonyl and decyl and the singly or multiply branched analogs of these. Alkyl which is not in the ortho position to the OH group is preferably straight-chain or branched $C_1$–$C_{10}$-alkyl, such as methyl, ethyl, n-propyl, and $C_4$–$C_{10}$-alkyl as defined above. Suitable alkoxy radicals in phenol groups of the formulae (IV) and (V) are $C_1$–$C_{10}$-alkoxy, the $C_1$–$C_{10}$-alkyl part being as defined above.

Preferred alkoxycarbonylalkyl groups are $C_1$–$C_{20}$-alkoxycarbonyl-$C_1$–$C_6$-alkyl, the alkyl part of the $C_1$–$C_{20}$-alkoxy group including, for example, $C_1$–$C_{10}$-alkyl as defined above. Other examples are decyl, undecyl, lauryl, tridecyl, myristyl, pentadecyl, palmityl, heptadecyl, stearyl, nonadecyl and arachyl.

R²³ is preferably $C_1$–$C_6$-alkyl as defined above. Suitable heteroarylamino groups include, for example, 1,3,5-triazinyl. Suitable substituents of arylamino and heteroarylamino radicals are cyano, hydroxyl, $C_1$–$C_4$-alkyl, halogen, such as fluorine, chlorine, bromine or iodine, and $C_1$–$C_{10}$-alkylthio groups, the alkyl part being as defined above.

Stabilizers which have phenolic OH groups and which are known from the prior art may be used as component $D_1$. Suitable compounds having one, two, three or four sterically hindered phenol groups are described in EP 0 038 183, the entire contents of which are incorporated herein by way of reference. Particular preference is given to 2,2'-thiobis(4-methyl-6-(1,1-dimethylethyl)phenol), diethyl 3,5-bis(1,1-dimethylethyl)-4-hydroxybenzylphosphonate and octadecyl 3-(3,5-bis(1,1-dimethylethyl)-4-hydroxyphenyl)-propionate (eg. Irganox 1076 from Ciba-Geigy).

The phosphonite (component $D_2$) is preferably selected from the group consisting of compounds of the formula (VI)

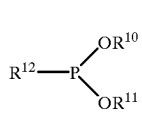

where
R¹⁰ and R¹¹ are identical or different and are selected from the group consisting of hydrogen, straight-chain or branched alkyl, unsubstituted or substituted aryl and unsubstituted or substituted aralkyl, and
R¹² is straight-chain or branched alkyl, unsubstituted or substituted aryl, unsubstituted or substituted aralkyl or

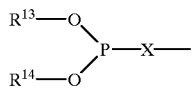

where
—X— is unsubstituted or substituted alkylene or unsubstituted or substituted arylene; and
R¹³ and R¹⁴, independently of one another, are as defined for R¹⁰ and R¹¹.
R¹⁰, R¹¹, R¹³ and R¹⁴ may, for example, be straight-chain or branched $C_1$–$C_{10}$-alkyl as defined above.

The phosphonite is in particular selected from the group consisting of compounds of the formula (VI), where R¹⁰, R¹¹, R¹³ and R¹⁴, independently of one another, are unsubstituted or singly or multiply substituted aryl or unsubstituted or singly or multiply substituted aralkyl, the substituents being selected from the group consisting of straight-chain or branched $C_1$–$C_{10}$-alkyl radicals, and X is phenylene or biphenylene. Examples of suitable $C_1$–$C_{10}$-alkyl radicals have been given above. $C_4$–$C_{10}$ substituents as defined above are particularly preferred.

The phosphonites used according to the invention as component $D_2$ are organically substituted esters of phosphonous acid (HP(OH)₂). Suitable phosphonites are, for example, also described in EP 0 036 278, the entire contents of which are incorporated herein by way of reference. Preference is given to the use of diphosphonites, such as tetrakis(2,4-bis(1,1-dimethylethyl)-phenyl) 4,4'-diphenylenediphosphonite.

The synthesis of phosphonites is described in Houben-Weyl, Methoden der Organischen Chemie, Vol. El, Organische Phosphorverbindungen I, p. 291 ff, 1982, Thieme Verlag Stuttgart.

Substances used as impact modifiers (component E) are impact-modifying rubbers in proportions of up to about 50% by weight, preferably up to about 25% by weight, and in particular up to about 20% by weight, based on the total weight of the molding composition.

Natural or sythetic rubbers may be used as component E. Examples of impact modifiers, besides natural rubber, are polybutadiene, polyisoprene and copolymers of butadiene and/or isoprene with styrene and with other suitable comonomers which have a glass transition temperature, determined according to K. H. Illers and H. Breuer, Kolloidzeitschrift 190 (1), 16–34 (1963), of below −20° C. Correspondingly hydrogenated products may also be used.

Preferred impact modifiers E are block polymers made from vinylaromatics and dienes. Impact modifiers of this type are known. DE-B-1 932 234, DE-B-2 000 118 and DE-A-2 255 930 describe differently constructed tastomeric block copolymers which include vinylaromatic blocks and diene blocks. The use of corresponding hydrogenated block copolymers, in some cases mixed with the non-hydrogenated precursor, as impact modifiers is described, for example, in DE-A-2 750 515, DE-A-2 434 848, DE-A-3 038 551, EP-A-0 080 666 and WO 83/01254. The disclosure of the above publications is expressly incorporated herein by way of reference.

Vinylaromatic-diene block copolymers which may be used according to the invention are in particular made from blocks which contain a hard phase (block type S) and, as soft phase, a block B/S made from diene units and vinylaromatic units and having random construction. The construction here may be homogeneous or inhomogeneous on statistical average along the length of the chain.

A suitable elastomeric block copolymer of this type according to the invention is obtained by forming the soft phase from a random copolymer of a vinylaromatic with a diene; random copolymers of vinylaromatics and dienes are obtained by polymerization in the presence of a polar cosolvent.

A block copolymer which may be used according to the invention is, for example, one of the following formulae (1) to (11):
(1) $(S-B/S)_n$;
(2) $(S-B/S)_n$-S;
(3) B/S-$(S-B/S)_n$;
(4) X-$[(S-B/S)_n]_m$+1
(5) X-$[(B/S-S)_n]_m$+1;
(6) X-$[(S-B/S)_n$-S$]_m$+1;
(7) X-$[(B/S-S)_n$-B/S$]_m$+1;
(8) Y-$[(S-B/S)_n]_m$+1;
(9) Y-$[(B/S-S)_n]_m$+1;
(10) Y-$[(S-B/S)_n$-S$]_m$+1;
(11) Y-$[(B/S-S)_n$-B/S$]_m$+1;
where
S is a vinylaromatic block,
B/S is the soft phase made from a block built up randomly from diene units and vinylaromatic units,
X is the radical of an n-functional initiator,
Y is the radical of an m-functional coupling agent and m and n are natural numbers from 1 to 10.

Preference is given to a block copolymer of one of the formulae S-B/S-S, X-[-B/S-S]$_2$ and Y-[-B/S-S]$_2$ (the abbreviations having the meanings given above) and particular preference is given to a block copolymer whose soft phase is subdivided into blocks
(12) $(B/S)_1$-$(B/S)_2$;
(13) $(B/S)_1$-$(B/S)_2$-$(B/S)_1$;
(14) $(B/S)_1$-$(B/S)_2$-$(B/S)_3$;
where the indices 1, 2 and 3 indicate different structures in the sense that the vinylaromatic/diene ratio in the individual blocks B/S is different or changes continuously within a block within the limits $(B/S)_1(B/S)_2$, the glass transition temperature $T_g$ of each sub-block being below 25° C.

Preference is likewise given to a block copolymer having a number of blocks B/S and/or S with differing molar mass in each molecule.

Likewise, a block B may take the place of a block S built up exclusively from vinylaromatic units, since the essential point is solely that an elastomeric block copolymer is formed. Such copolymers can, for example, have one of the structures (15) to (18)
(15) B-(B/S)
(16) (B/S)-B-(B/S)
(17) $(B/S)_1$-B-$(B/S)_2$
(18) B-$(B/S)_1$-$(B/S)_2$.

Preferred vinylaromatics are styrene, o-methylstyrene, vinyltoluene and mixtures of these. Preferred dienes are butadiene, isoprene, piperylene, 1-phenylbutadiene and mixtures of these. A particularly preferred monomer combination is butadiene and styrene.

The soft blocks are particularly preferably built up from about 25 to 75% by weight of styrene and from about 25 to 75% by weight of butadiene. Particularly preferred soft blocks have a butadiene proportion of from about 34 to 69% by weight and a styrene proportion of from about 31 to 66% by weight.

The proportion by weight of the diene in the entire block copolymer, in the case of the monomer combination styrene/butadiene, is from 15 to 65% by weight, and that of the vinylaromatic component is correspondingly from 85 to 35% by weight. Particular preference is given to butadiene-styrene block copolymers having a monomer formulation of from 25 to 60% by weight of diene and from 75 to 40% by weight of vinylaromatic compound.

The block copolymers are prepared by anionic polymerization in a non-polar solvent with addition of a polar cosolvent. The cosolvent appears here to operate as Lewis base with respect to the metal cation. Preferred solvents are aliphatic hydrocarbons, such as cyclohexane or methylcyclohexane. Preferred Lewis bases are polar aprotic compounds, such as ethers and tertiary amines. Examples of particularly effective ethers are tetrahydrofuran and aliphatic polyethers, such as diethylene glycol dimethyl ether. Examples of tertiary amines are tributylamine and pyridine. The polar cosolvent is added to the non-polar solvent in a subordinate amount, eg. from 0.5 to 5% by volume. Tetrahydrofuran in an amount of from 0.1 to 0.3% by volume is particularly preferred. Experience has shown that an amount of about 0.2% by volume is adequate in most cases.

The structure and amount of the Lewis base determine the copolymerization parameters and the proportion of 1,2 and 1,4 linkages of the diene units. The polymers according to the invention have, for example, a proportion of 15 to 40% of 1,2 linkages and from 85 to 60% of 1,4 linkages, based on all diene units.

The anionic polymerization is initiated by organometallic compounds. Compounds of the alkali metals, in particular of lithium, are preferred. Examples of initiators are methyllithium, ethyllithium, propyllithium, n-butyllithium, sec-butyllithium and tert-butyllithium. The organometallic compound is added as a solution in a chemically inert hydrocarbon. The amount varies according to the desired molecular weight of the polymer, but is generally in the range from 0.002 to 5 mol %, based on the monomers.

The polymerization temperature can be from about 0 to 130° C., preferably from 30 to 100° C.

The volume proportion of the soft phase in the material is decisive in determining the mechanical properties. According to the invention, the volume proportion of the soft phase built up from diene and vinylaromatic sequences is from 60 to 95% by volume, preferably from 70 to 90% by volume, and particularly preferably from 80 to 90% by volume. The blocks A formed from the vinylaromatic monomers form the hard phase, whose volume proportion is correspondingly from 1 to 40% by volume, preferably from 10 to 30% by volume, and particularly preferably from 10 to 20% by volume.

It should be pointed out that there is no precise agreement between the abovementioned quantity ratios of vinylaromatic compound and diene, the threshold values of the phase volumes stated above and the composition implied by the glass transition temperature ranges according to the invention, since in each case the values are rounded to the nearest whole number. Where this is the case, it would be coincidental.

The volume proportion of the two phases can be measured by phase-contrast electron microscopy or solid-state NMR spectroscopy. The proportion of the vinylaromatic blocks can be determined, after osmium degradation of the polydiene fraction, by precipitation and weighing. If polymerization is always allowed to proceed to completion, the future phase ratio of any polymer can be calculated from the amounts of monomers employed.

For the purposes of the invention, the block copolymer is uniquely defined by the quotient calculated from the volume proportion in percent of the soft phase formed from the B/S blocks and the proportion of diene units in the soft phase; for the combination styrene/butadiene, this is from 25 to 70% by weight.

The glass transition temperature ($T_g$) is influenced by the random incorporation of the vinylaromatic compounds into the soft block of the block copolymer and the use of Lewis bases during the polymerization. The glass transition temperature of the entire copolymer is preferably from −50° C. to +25° C., particularly preferably below 0° C.

The molecular weight of the block S is preferably from 1000 to 200,000, in particular from 3000 to 80,000 [g/mol]. Blocks S may have different molecular weights within a single molecule.

The molecular weight of block B/S is usually from 2000 to 250,000, preferably from 5000 to 150,000 [g/mol].

Block B/S may, like block S, assume different molecular weight values within a single molecule.

The coupling center X is formed by reaction of the living anionic chain ends with an at least bifunctional coupling agent. Examples of such compounds may be found in U.S. Pat. Nos. 3,985,830, 3,280,084, 3,637,554 and 4,091,053. Preference is given to the use of, for example, epoxidized glycerides, such as epoxidized linseed oil or soya oil; divinylbenzene is also suitable. Dichlorodialkyl-silanes, dialdehydes, such as terephthalaldehyde, and esters, such as ethyl formate or benzoate, are suitable specifically for dimerization.

Preferred polymer structures are S-B/S-S, X-[-B/S-S]$_2$ and Y-[-B/S-S]$_2$, where the random block B/S may itself be subdivided into blocks B1/S1-B2/S2-B3/S3-. . . . The random block consists preferably of from 2 to 15 random sub-blocks, particularly preferably of from 3 to 10 sub-blocks. The division of the random block B/S into very many sub-blocks Bn/Sn brings the decisive advantage that, even in the case of a formulation gradient within a sub-block Bn/Sn, such as is difficult to avoid in anionic polymerization under industrial conditions, the block B/S behaves overall as an almost perfect random polymer. There is therefore the opportunity of adding less than the theoretical amount of Lewis base, thereby increasing the proportion of 1,4 diene linkages, reducing the glass transition temperature $T_g$ and lessening the susceptibility of the polymer to crosslinking. A larger or a smaller proportion of the sub-blocks may be given a high diene content. This has the effect that the polymer retains a residual toughness even below the glass transition temperature of the predominant blocks B/S, and does not become completely brittle.

All of the weight and volume data given above relate to the monomer combination butadiene/styrene. These data can, however, easily be recalculated for other monomers technically equivalent to styrene and butadiene.

The block copolymers can be worked up by protonating the carbanions with an alcohol, such as isopropanol, acidifying the reaction mixture, eg. with a mixture of $CO_2$ and water, and removing the solvent. The block copolymers may contain oxidation inhibitors and antiblocking agents.

Mixtures of the above rubbers may also be used in the novel molding compositions.

The novel molding compositions may also contain, as further constituent (component F), conventional additives and processing aids. The proportion of these additives is generally not more than about 60% by weight, preferably not more than about 50% by weight, and in particular not more than about 40% by weight, based on the total weight of components A to E.

Examples of additives are heat and light stabilizers, mold release agents, colorants, such as dyes and pigments, in conventional amounts. Further examples are lubricants, such as polyethylene wax. Other additives are reinforcing agents, such as glass fibers, carbon fibers or aromatic polyamide fibers, and/or fillers, gypsum fibers, synthetic calcium silicates, kaolin, calcined kaolin, wollastonite, talc and chalk.

Carbon blacks or titanium dioxide may, for example, be used as pigments. If $TiO_2$ is used, the mean particle size is generally in the range from about 50 to 400 nm, in particular from about 150 to 240 nm. Rutiles and anatase are in industrial use, if desired coated with metal oxides, such as aluminum oxides, silicon oxides, oxides of zinc or siloxanes.

The term carbon blacks is taken to mean microcrystalline, fine-particle carbons (cf. Kunststofflexikon, 7th Edition 1989). Suitable carbon blacks are furnace blacks, acetylene blacks, gas blacks and the thermal blacks obtained by preparation using heat. The particle sizes are preferably in the range from about 0.01 to 0.1 $\mu$m and the surface areas in the range from about 102 to $10^4$ m$^2$/g (BET/ASTM D 3037) with DBP absorptions of from about $10^2$ to $10^3$ ml/100 g (ASTM D 2414).

Antidrip agents, such as Teflon, and halogen-free antidrip agents may also be used as component F. Suitable halogen-free antidrip agents are described, for example, in DE 19524585, which are incorporated herein by way of reference.

These halogen-free antidrip agents preferably comprise polymers based on vinylaromatic monomers and having molecular weights ($M_w$) of at least 800,000 g/mol and a narrow molecular weight distribution.

These polymers based on vinylaromatic monomers may be either homopolymers or random copolymers or block copolymers, such as alternating block copolymers, star block copolymers or three- or five-block copolymers. They may also be mixtures of different polymers. Preference is given to the use of homopolymers. The polymers based on vinylaromatic monomers may be either syndiotactic or atactic, but atactic polymers based on vinylaromatic monomers are usually used.

Suitable vinylaromatic monomers generally have from 8 to 12 carbon atoms, for example in particular styrene or ring- or side-chain-substituted styrenes. Examples are o-methylstyrene, m-methylstyrene, p-methylstyrene and p-tert-butylstyrene.

Other monomers may also be used with these, in particular those which can be anionically copolymerized with the abovementioned monomers. Examples are acrylonitrile, methacrylonitrile, 2-vinylpyridine, 4-vinylpyridine and vinylpyrrolidone.

Very particularly preferred antidrip agents according to the invention comprise polystyrene homopolymers.

The polymers based on vinylaromatic monomers have molecular weights (weight average $M_w$) of at least 800,000 g/mol, for example 900,000 g/mol or above. The molecular weights ($M_w$) are generally in the range from 800,000 to $2.8 \times 10^5$ g/mol, preferably in the range from $1 \times 10^6$ to $2.5 \times 10^6$ g/mol. In a particularly preferred embodiment, the molecular weights ($M_w$) are in the range from $1.1 \times 10^6$ to $2.3 \times 10^6$, in particular from $1.2 \times 10^6$ to $2.2 \times 10^6$ g/mol.

The polymers based on vinylaromatic monomers have a narrow molecular weight distribution, ie. the ratio of the weight-average value to the number-average value of the molecular weights $M_w/M_n$ is small. The ratio $M_w/M_n$ is preferably 2.5 or less, particularly preferably 2 or less, for example less than 1.8.

The polymers which are based on vinylaromatic monomers and are present in the antidrip agents are preferably prepared by anionic polymerization, particularly preferably by anionic dispersion polymerization. Anionic polymerization processes are known per se. The polymerization is generally carried out in the presence of stoichiometric amounts of organic lithium compounds, preferably alkyl-lithium compounds, in particular n-butyllithium, sec-butyllithium or tert-butyllithium.

Anionic dispersion polymerization is generally carried out in an inert solvent in which the polymer is insoluble. The reaction can also be carried out in a solvent mixture of short-chain and long-chain aliphatic hydrocarbons. Examples of suitable solvents are butane, isobutane, pentane, isopentane, hexane, heptane, 2,2-dimethylbutane, petroleum ether and cyclohexane. These may be used in a mixture with hydrocarbons having 14 or more carbon atoms, for example tetradecane, hexadecane, octadecane or eicosane, or liquid oligomers of olefins such as ethylene or higher olefins having from 3 to 12 carbon atoms, such as decene.

Solid oligomers of the abovementioned olefins or polystyrenes or polysiloxanes of low molecular weight may also be used in addition, as cosolvents.

The reaction may also be carried out in the presence of polymeric dispersants which hold in suspension the polymer which is formed. Examples of dispersants are copolymers of styrene and either butadiene or isoprene or hydrogenated isoprenes.

The use of pentane as solvent is particularly preferred, as is the use of styrene-butadiene block copolymers as dispersant.

Examples of suitable styrene-butadiene block copolymers are two-block copolymers of a-b type, where a is a polymer block made from styrene and b is a polymer block made from butadiene, preferably 1,4-polybutadiene. The total of components a and b is 100% by weight and the proportion of a and b can vary. Thus a may be from 10 to 90% by weight and b correspondingly from 90 to 10% by weight, a being preferably from 20 to 80% by weight and b preferably from 80 to 20% by weight. The commercially available products ®Nippon NS 312, ®Buna KA 8497, ®Kraton G 1701X and ®Septon 1001 are, for example, suitable.

An example of a particularly suitable styrene-butadiene block copolymer is a styrene-butadiene two-block copolymer which may be hydrogenated and is used in an amount of, for example, from 1 to 10% by weight, based on the vinylaromatic monomer. It is expediently added in the form of a solution in the monomer to the dispersion which is to be polymerized.

For preparing random copolymers, compounds may additionally be used which encourage the tendency to random distribution. Examples of such compounds are tetrahydrofuran, tetramethyl-ethylenediamine, potassium amylate and tert-butyl phosphate.

The polymerization process is mostly carried out at from 0 to 100° C., preferably at from 0 to 30° C. The reaction may be carried out either at atmospheric pressure or at elevated pressures.

It is mostly sufficient if the antidrip agents are present in the thermoplastic molding compositions in small amounts, for example from about 0.5 to 25% by weight, based on the entire formulation. Preferred formulations of thermoplastic molding compositions and antidrip agents contain from 1 to 20% by weight, in particular from 1 to 15% by weight, of antidrip agents.

The novel molding compositions are expediently prepared by mixing the components at from 230 to 320° C. in conventional mixing apparatus, for example compounders, Banbury mixers and single-screw extruders, preferably with a twin-screw extruder. In order to obtain a very homogeneous molding composition, intensive mixing is required. The sequence of mixing of the components may be varied; two or, if desired, more components may be premixed or all of the components may be mixed together.

From the novel molding compositions, which have very good flowability, good resistance to thermo-oxidation, good multiaxial toughness and favorable stress cracking behavior, it is possible to produce, for example by injection molding or extrusion, shaped articles which are flame-retardant and have excellent mechanical properties.

The novel molding compositions are very suitable for producing moldings of any type, for example by injection molding or extrusion. They can also be used for producing films and semifinished products in the thermoforming or blowing process.

EXAMPLE

Using the components A–F listed below, novel molding compositions 1, 2 and 3 are prepared and are compared, with regard to their characteristic properties, with the comparative molding compositions 1c–6c.

Component A

Poly-2,6-dimethyl-1,4-phenylene ether with a mean molecular weight ($M_w$) of 40,000 g/mol.

Component $B_1$

Impact-modified polystyrene with 9% by weight of polybutadiene and cell particle morphology, mean particle size of the soft component of 1 µm. The VN of the hard matrix was 80 ml/g (0.5% strength in toluene at 23° C.).

Component $B_2$

Impact-modified polystyrene with 9% by weight of polybutadiene and cell particle morphology, mean particle size of the soft component 5 µm. The VN of the hard matrix was 80 ml/g (0.5% strength in toluene at 23° C.).

Componente $C_1$

Resorcinol diphenyl phosphate, commercially available product Fyrolflex RDP (Akzo).

Component C$_2$

Triphenyl phosphate, eg. Disflamoll TP.

Component D$_1$

Octadecyl 3-(3,5-bis(1,1-dimethylethyl)-4-hydroxyphenyl)-propionate, eg. Irganox 1076 from Ciba-Geigy.

Component D$_2$

Tetrakis(2,4-bis(1,1-dimethylethyl)phenyl) 4,4'-diphenylene-diphosphonite, eg. Irgafos PEPQ from Ciba-Geigy.

For comparative experiments, the following components D$_3$ and D$_4$ are used:

Component D3

ZnO

Component D$_4$

Bis(2,4-di-tert-butylphenyl)pentaerythritol diphosphite eg. Ultranox 626 from General Electric.

Component E

SEPS block rubber, eg. Kraton G 1650 (Shell AG).

Component F

Teflon dispersion 60N from Du Pont. Preparation of the thermoplastic molding compositions:

The components A) to F) were mixed in a twin-screw extruder (ZSK 30 from Werner & Pfleiderer) at 270° C., extruded, cooled and granulated.

Determination of the properties of the thermoplastic molding compositions:

The dried granules were converted at from 250 to 280° C. into disks, flat specimens of thickness 1/16" for the UL 94 test and tensile specimens.

The fracture energy W$_S$ was determined according to DIN 53 443 at 23° C. To assess heat ageing resistance, disks of the specimens were stored for 14 days at 90° C. and then the fracture energy was determined.

The flame retardance was determined according to UL 94 on specimens of 1/16" thickness; the afterflame times shown are the total of the afterflame times from both flame applications.

The flowability of the molding compositions was determined according to DIN 53 735 at a melt temperature of 275° C. and using a load of 21.6 kg.

The resistance to stress cracking was determined qualitatively using a variant similar to the bent strip method, in which tensile specimens were clamped on a template with a bending radius of 120 mm and wetted with tributyl phosphate for 10 s, after which the time (t$_{Br}$) to break was determined.

The formulations and properties of the thermoplastic molding compositions which were prepared are shown in Table 1.

TABLE 1

| Component [% by weight] | Molding composition No. | | | | | | | | |
|---|---|---|---|---|---|---|---|---|---|
| | 1c | 1 | 2c | 3c | 4c | 5c | 6c | 2 | 3 |
| A | 54.3 | 54.3 | 54.9 | 54.3 | 54.3 | 54.3 | 54.3 | 54.3 | 43.4 |
| B$_1$ | 37.7 | 37.7 | 38.0 | 37.7 | 37.7 | 37.7 | 37.7 | 29.8 | 43.6 |
| B$_2$ | — | — | — | — | — | — | — | 7.9 | — |
| C$_1$ | — | 4 | 4.1 | 4 | 4 | 4 | 4 | 4 | 8.2 |
| C$_2$ | 4 | — | — | — | — | — | — | — | — |

TABLE 1-continued

| Component [% by weight] | Molding composition No. | | | | | | | | |
|---|---|---|---|---|---|---|---|---|---|
| | 1c | 1 | 2c | 3c | 4c | 5c | 6c | 2 | 3 |
| D$_1$ | 0.5 | 0.5 | — | 1 | — | 0.5 | 0.5 | 0.5 | 0.5 |
| D$_2$ | 0.5 | 0.5 | — | — | 1 | — | — | 0.5 | 0.5 |
| D$_3$ | — | — | — | — | — | 0.5 | — | — | — |
| D$_4$ | — | — | — | — | — | — | 0.5 | — | — |
| E | 3 | 3 | 3 | 3 | 3 | 3 | 3 | 3 | 3.5 |
| F | — | — | — | — | — | — | — | — | 0.3 |
| W$_S$ [Nm] | 27 | 31 | 32 | 31 | 31 | 27 | 31 | 35 | 42 |
| W$_S$, 14 d [Nm] | 9 | 14 | 2 | 4 | 7 | 11 | 10 | 15 | 18 |
| UL 94 | V-1 | V-1 | V-1 | V-1 | V-1 | V-1 | V-1 | V-1 | V-1 |
| After-flame time [s] | 103 | 99 | 112 | 110 | 120 | 134 | 104 | 105 | 134 |
| MVI [ml/10'] | 29 | 28 | 26 | 27 | 28 | 27 | 28 | 26 | 125 |
| t$_{Br}$[s] | 101 | >300 | >300 | 190 | 210 | 230 | 215 | >300 | >300 |

As the experiments shown in Table 1 confirm, the novel formulations have a balanced property profile. The favorable stress cracking behavior (t$_{Br}$>300 s) with, at the same time, improved heat ageing resistance (W$_s$(14d)≧14 Nm) are in particular worthy of mention. The data obtained reveal, in particular, a surprisingly clear improvement in properties in comparison with those of known molding compositions according to EP 0 036 278 (=1c), EP 0 467 113 (=6c) and JP-A-04279660 (=5c).

We claim:

1. A flame-retardant thermoplastic molding composition comprising

A) at least one polyphenylene ether, and

B) at least one vinylaromatic polymer, wherein the thermoplastic molding composition includes C) at least one oligomeric phosphorus compound as flame retardant and D) a mixture of D$_1$) at least one sterically hindered phenol and D$_2$) at least one phosphonite as stabilizer.

2. A molding composition as claimed in claim 1, wherein the oligophosphorus compound is selected from the group consisting of compounds of the formulae (I), (II) and (III)

(III)

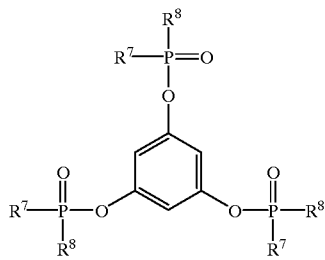

where

R¹ and R⁴, independently of one another, are unsubstituted or substituted alkyl or aryl;

R², R³, R⁷ and R⁸, independently of one another, are unsubstituted or substituted alkyl, aryl, alkoxy or aryloxy, R⁵ is alkylene, —SO₂—, —CO—, —N=N— or —(R⁶)P(O)—, where R⁶ is unsubstituted or substituted alkyl, aryl or alkylaryl and n and p, independently of one another, are integers or non-integers from 1 to 30.

3. A molding composition as claimed in claim 2, wherein resorcinol diphenyl phosphate and/or hydroquinone diphenyl phosphate is used as flame retardant.

4. A molding composition as claimed in claims 1 which contains the stabilizer mixture in a proportion of from about 0.1 to about 5% by weight, based on the total weight of the composition.

5. A molding composition as claimed in any of the preceding claims 1, wherein the sterically hindered phenol is selected from the group consisting of compounds of the formula (Ph)$_a$Z where a is an integer from 1 to 4, Z is hydrogen or, if a is 2, 3 or 4, a bridging group having 2, 3 or 4 bonded Ph groups, Ph is a sterically hindered phenol group of the formula (IV) or (V),

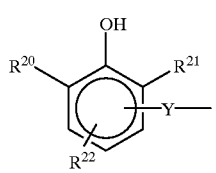
(IV)

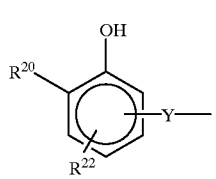
(V)

where

R²⁰ is straight-chain or branched C₄–C₁₀-alkyl,

R²¹ is hydrogen or is as defined for R²⁰,

R²² is selected from the group consisting of hydrogen, alkyl, alkoxy, alkoxycarbonylalkyl, —P(O)(OR²³)₂, where R²³ is C₁–C₂₀-alkyl, amino, unsubstituted or substituted arylamino and unsubstituted or substituted heteroarylamino; and Y is a chemical bond or carbonylalkyl.

6. A molding composition as claimed in claim 5, wherein, if a is 2, Z is —S—, —O—, —N—, alkylene, cycloalkylene, cyclo-alkylidene or diiminoalkylene;

if a is 3, Z is

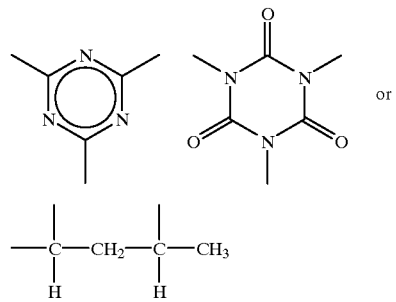

if a is 4, z is

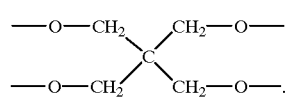

7. A molding composition as claimed in claims 1, wherein the phosphonite is selected from the group consisting of compounds of the formula (VI)

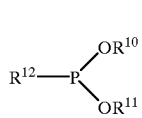
(VI)

where

R¹⁰ and R¹¹ are identical or different and are selected from the group consisting of hydrogen, straight-chain or branched alkyl, unsubstituted or substituted aryl and unsubstituted or substituted aralkyl, and R¹² is straight-chain or branched alkyl, unsubstituted or substituted aryl, unsubstituted or substituted aralkyl or

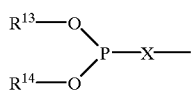

where

—X— is unsubstituted or substituted alkylene or unsubstituted or substituted arylene; and R¹³ and R¹⁴, independently of one another, are as defined for R¹⁰ and R¹¹.

8. A molding composition as claimed in claim 7, wherein the phosphonite is selected from the group consisting of compounds of the formula (VI) where R¹⁰, R¹¹, R¹³ and R¹⁴, independently of one another, are unsubstituted or singly or multiply substituted aryl or unsubstituted or singly or multiply substituted aralkyl, the substituents being selected from the group consisting of straight-chain or branched $C_1$–$C_{10}$-alkyl radicals, and X is phenylene or biphenylene.

9. A molding composition as claimed in claims 1, wherein octadecyl 3-(3,5-bis(1,1-dimethylethyl)-4-hydroxyphenyl) propionate is used as sterically hindered phenol and tetrakis (2,4-bis(1,1-dimethylethyl)phenyl) 4,4'-diphenylenediphosphonite is used as phosphonite, in a ratio of from about 1:9 to about 9:1.

10. A molding composition as claimed in claims 1, comprising
 A) from about 5 to about 97.9% by weight of polyphenylene ether;
 B) from about 1 to about 93.9% by weight of styrene polymer;
 C) from about 1 to about 20% by weight of flame retardant;
 D) from about 0.1 to about 5% by weight of stabilizer mixture of, based in each case on the total weight of component D;
  $D_1$) from about 5 to about 95% by weight of a sterically hindered phenol; and
  $D_2$) from about 5 to about 95% by weight of a phosphonite;
 E) from 0 to about 50% by weight of impact modifiers and
 F) from 0 to about 60% by weight of conventional additives.

11. A flame-retardant shaped article, fiber or film prepared using a molding composition as claimed in claim 1.

12. A method for preparing flame-retardant shaped articles, fibers or films comprising the step of mixing a molding composition as claimed in claim 1.

* * * * *

UNITED STATES PATENT AND TRADEMARK OFFICE
CERTIFICATE OF CORRECTION

PATENT NO. : 6,028,130
DATED : February 22, 2000
INVENTOR(S) : WEBER et al.

It is certified that error appears in the above-identified patent and that said Letters Patent is hereby corrected as shown below:

Column 17, claim 5, lines 34-35, change "any of the preceding claims 1" to --Claim 1--
Column 19, claim 10, line 9, change "claims" to --Claim--.
Column 20, claim 10, line 5, after "phenol" delete the semicolon --;--.

Signed and Sealed this

Ninth Day of January, 2001

Attest:

Q. TODD DICKINSON

*Attesting Officer*          *Commissioner of Patents and Trademarks*